US012742228B2

(12) United States Patent
Rame et al.

(10) Patent No.: US 12,742,228 B2
(45) Date of Patent: Sep. 22, 2026

(54) NICKEL-BASED SUPERALLOY, SINGLE-CRYSTAL BLADE AND TURBOMACHINE

(71) Applicants: SAFRAN, Paris (FR); SAFRAN AIRCRAFT ENGINES, Paris (FR); CENTRE NATIONAL DE LA RECHERCHE SCIENTIFIQUE, Paris (FR); UNIVERSITE DE POITIERS, Poitiers Cedex (FR); ECOLE NATIONALE SUPERIEURE D'ARTS ET METIERS, Paris (FR)

(72) Inventors: Jérémy Rame, Moissy-Cramayel (FR); Jonathan Cormier, Chasseneuil-du-Poitou (FR); Lorena Mataveli Suave, Moissy-Cramayel (FR); Edern Menou, Moissy-Cramayel (FR)

(73) Assignees: SAFRAN, Paris (FR); SAFRAN AIRCRAFT ENGINES, Paris (FR); CENTRE NATIONAL DE LA RECHERCHE SCIENTIFIQUE, Paris (FR); UNIVERSITE DE POITIERS, Poitiers Cedex (FR); ECOLE NATIONALE SUPERIEURE D'ARTS ET METIERS, Paris (FR)

( * ) Notice: Subject to any disclaimer, the term of this patent is extended or adjusted under 35 U.S.C. 154(b) by 376 days.

(21) Appl. No.: 18/573,287

(22) PCT Filed: Jun. 17, 2022

(86) PCT No.: PCT/FR2022/051185

§ 371 (c)(1),
(2) Date: Dec. 21, 2023

(87) PCT Pub. No.: WO2022/269177

PCT Pub. Date: Dec. 29, 2022

(65) Prior Publication Data

US 2024/0287650 A1 Aug. 29, 2024

(30) Foreign Application Priority Data

Jun. 22, 2021 (FR) ........................................ 2106613

(51) Int. Cl.
*C22C 19/05* (2006.01)
*C22C 19/00* (2006.01)
(Continued)

(52) U.S. Cl.
CPC .......... *C22C 19/057* (2013.01); *C22C 19/007* (2013.01); *C22C 30/00* (2013.01);
(Continued)

(58) Field of Classification Search
CPC .................................. C22C 19/057; C22F 1/10
See application file for complete search history.

(56) References Cited

U.S. PATENT DOCUMENTS

| | | | |
|---|---|---|---|
| 5,270,123 | A | 12/1993 | Walston et al. |
| 5,888,451 | A | 3/1999 | Konter et al. |
| 6,054,096 | A | 4/2000 | Duhl et al. |
| 2003/0041930 | A1 | 3/2003 | Deluca et al. |
| 2011/0135489 | A1 | 6/2011 | Strangman |

FOREIGN PATENT DOCUMENTS

| | | | |
|---|---|---|---|
| CN | 107960109 | A | 4/2018 |
| CN | 112262221 | A | 1/2021 |
| FR | 3081883 | A1 | 8/2020 |

OTHER PUBLICATIONS

Abstract of Jason S. Van Sluytman, Charles J. Moceri, Tresa M. Pollock, A Pt-modified Ni-base superalloy with high temperature precipitate stability, Materials Science and Engineering: A, vol. 639, 2015, pp. 747-754, ISSN 0921-5093, https://doi.org/10.1016/j.msea.2015.05.023. (https://www.sciencedirect.com/science/article/pii/S0921509315005456).

(Continued)

*Primary Examiner* — Jessee R Roe
(74) *Attorney, Agent, or Firm* — Bookoff McAndrews, PLLC

(57) ABSTRACT

The invention relates to a nickel-based superalloy comprising in weight percentages: 5.0 to 6.0% of aluminium, 6.0 to 9.0% of tantalum, 1.0 to 5.0% of cobalt, 5.0 to 7.5% of chromium, 0 to 1.0% of molybdenum, 4.0 to 6.0% of tungsten, 0.50 to 3.5% of rhenium, 1.0 to 4.0% of platinum, 0.05 to 0.25% of hafnium, 0 to 0.15% of silicon, the (Continued)

remainder consisting of nickel and unavoidable impurities. The invention also relates to a single-crystal blade comprising such an alloy and to a turbomachine comprising such a blade.

8 Claims, 1 Drawing Sheet

(51) Int. Cl.
*C22C 30/00* (2006.01)
*F01D 5/28* (2006.01)

(52) U.S. Cl.
CPC ........ *F01D 5/288* (2013.01); *F05D 2300/175* (2013.01); *F05D 2300/606* (2013.01); *F05D 2300/611* (2013.01)

(56) References Cited

OTHER PUBLICATIONS

R.A. MacKay, T.P. Gabb, A. Garg, R.B. Rogers, M.V. Nathal, Influence of composition on microstructural parameters of single crystal nickel-base superalloys, Materials Characterization, vol. 70, 2012, pp. 83-100, ISSN 1044-5803, https://doi.org/10.1016/j.matchar.2012.05.001. (https://www.sciencedirect.com/science/article/pii/S1044580312001283).

Rame, J. et al. (2020). Platinum-Containing New Generation Nickel-Based Superalloy for Single Crystalline Applications. In: Tin, S., et al. Superalloys 2020. The Minerals, Metals & Materials Series. Springer, Cham. https://doi.org/10.1007/978-3-030-51834-9_7.

Search Report and Written Opinion issued in International Application No. PCR/FR2022/051185, mailed Sep. 23, 2022.

Search Report issued in French Application No. 2106613, mailed on Feb. 10, 2022.

Office Action issued in Chinese Patent Application No. 202280049520.4, dated Jul. 6, 2026, 16 pages.

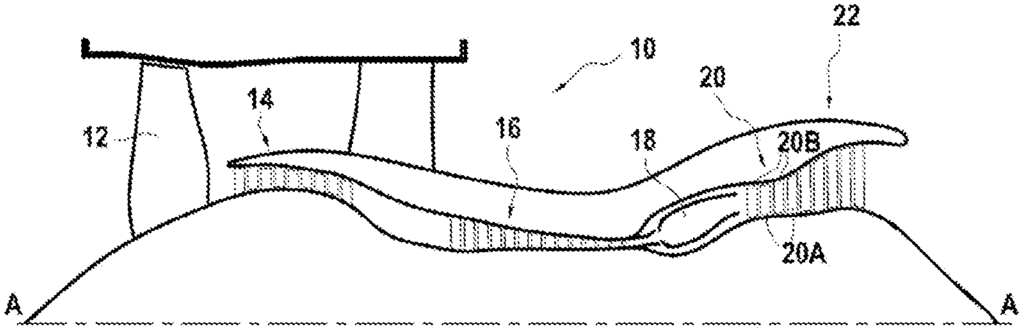
22
10
20
14
16
18
20B
12
20A
A
A

NICKEL-BASED SUPERALLOY, SINGLE-CRYSTAL BLADE AND TURBOMACHINE

CROSS-REFERENCE TO RELATED APPLICATIONS

This is a National Stage Application under 35 U.S.C. § 371 of International Application No. PCT/FR2022/051185, filed Jun. 17, 2022, now published as WO 2022/269177 A1, which claims priority to French Patent Application No. the entireties of which are incorporated herein by reference.

TECHNICAL FIELD

The present disclosure relates to nickel-based superalloys for gas turbines, particularly for fixed blades (vanes), also called nozzles or flow straighteners, or moving blades of a gas turbine, for example in the field of aeronautics.

PRIOR ART

It is known to use nickel-based superalloys for the production of single-crystal vanes or blades of gas turbines for aeroplane or helicopter engines.

The main advantages of these materials are to combine both high creep resistance at high temperature as well as a resistance to oxidation and corrosion.

Over time, nickel-based superalloys for single-crystal blades have undergone significant developments in chemical composition, in particular with the aim of improving their creep properties at high temperature while maintaining a resistance to the very aggressive environment in which these superalloys are used.

Furthermore, metal coatings suitable for these alloys have been developed in order to increase their resistance to the aggressive environment in which these alloys are used, particularly resistance to oxidation and resistance to corrosion. Moreover, a ceramic coating with low thermal conductivity, fulfilling a thermal barrier function, can be added in order to reduce the temperature at the surface of the metal.

Typically, a complete protection system comprises at least two layers.

The first layer, also called the sublayer or connection layer, is directly deposited on the nickel-based superalloy part to be protected, also called the substrate, for example a blade. The deposition step is followed by a step of diffusion of the sublayer into the superalloy. The deposition and diffusion can also be carried out during a single step.

The materials generally used to produce this sublayer comprise alumina forming metal alloys of type MCrAlY (M=Ni (nickel) or Co (cobalt)) or a mixture of Ni and Co, Cr=chromium, Al=aluminium and Y=yttrium, or nickel aluminide type alloys (NixAly), some also containing platinum (NixAlyPtz).

The second layer, generally called a thermal barrier coating or "TBC", is a ceramic coating comprising, for example, yttria-stabilised zirconia, also called "YSZ" or "YPSZ" for yttria partially stabilized zirconia, and having a porous structure. This layer can be deposited by various processes, such as electron beam physical vapour deposition (EB-PVD), atmospheric plasma spraying (APS) or suspension plasma spraying (SPS), or any other process capable of obtaining a porous ceramic coating with low thermal conductivity.

The use of these materials at high temperature, for example from 650° C. to 1100° C., produces interdiffusion phenomena on the microscopic scale between the nickel-based superalloy of the substrate and the metal alloy of the sublayer. These interdiffusion phenomena, associated with oxidation of the sublayer, in particular modify the chemical composition, microstructure and consequently mechanical properties of the sublayer, starting from the production of the coating and continuing during use of the blade in the turbine. These interdiffusion phenomena also modify the chemical composition, microstructure and consequently the mechanical properties of the superalloy of the substrate under the coating. In superalloys with a very high content of refractory elements, in particular rhenium, a secondary reaction zone (SRZ) can form in the superalloy under the sublayer, over a depth of several tens, or even hundreds, of micrometres. The mechanical properties of this SRZ are significantly inferior to those of the superalloy of the substrate. The formation of SRZ is undesirable, because it leads to a significant reduction in the mechanical strength of the superalloy.

These changes in the connection layer, associated with stress fields linked to the growth of the alumina layer which forms in operation at the surface of this connection layer, also known as thermally grown oxide (TGO), and with the differences in thermal expansion coefficient between the various layers, generate debonding in the interfacial zone between the sublayer and the ceramic coating, which can lead to partial or total spalling of the ceramic coating. The metal portion (superalloy substrate and metal sublayer) is then bared and directly exposed to the combustion gases, which increases the risk of damage of the blade and therefore of the gas turbine.

Moreover, the complexity of the chemistry of these alloys can lead to a destabilisation of their optimum microstructure with the appearance of undesirable particulate phases when the parts from these alloys are held at high temperature. This destabilisation has negative consequences for the mechanical properties of these alloys. These undesirable phases with complex crystalline structure and fragile nature are called topologically close-packed (TCP) phases.

In addition, foundry defects can form in the parts, such as blades, during their production by directed solidification. These defects are generally parasitic grains of the "freckle" type, the presence of which can cause premature breaking of the part in service. The presence of these defects, linked to the chemical composition of the superalloy, generally leads to rejection of the part, which results in an increase in the production cost.

DISCLOSURE OF THE INVENTION

The present disclosure aims to provide nickel-based superalloy compositions for the production of single-crystal components, having improved performance in terms of service life and mechanical strength and enabling the production costs of the part to be reduced (reduction in the rejection rate) when compared with existing alloys. These superalloys have a creep resistance at high temperature greater than that of existing alloys while demonstrating good microstructural stability in the volume of the superalloy (low sensitivity to the formation of TCP), good microstructural stability under the sublayer of thermal barrier coating (low sensitivity to the formation of SRZ) and good resistance to oxidation and corrosion, while avoiding the formation of "freckle" type parasite grains.

To this effect, the present disclosure relates to a nickel-based superalloy comprising, in weight percentages: 5.0 to 6.0% aluminium, 6.0 to 9.0% tantalum, 1.0 to 5.0% cobalt, 5.0 to 7.5% chromium, 0 to 1.0% molybdenum, 4.0 to 6.0% tungsten, 0.50 to 3.5% rhenium, 1.0 to 4.0% platinum, 0.05 to 0.25% hafnium, 0 to 0.15% silicon, the remainder consisting of nickel and unavoidable impurities.

This superalloy is intended for the production of single-crystal gas turbine components, such as fixed (vanes) or moving blades.

Through this nickel-based superalloy composition (Ni), the creep resistance is improved compared with existing superalloys, in particular at temperatures ranging up to 1100° C., and the adherence of the thermal barrier is reinforced compared to that observed on existing superalloys, in particular due to the removal of titanium, the high chromium content and the addition of platinum.

This alloy therefore has an improved creep resistance at high temperature. The service life of this alloy being thus long, this alloy also has an improved resistance to corrosion and oxidation. This alloy can also have improved thermal fatigue resistance.

These superalloys have a density greater than or equal to 8.75 $g/cm^3$ and less than or equal to 8.95 $g/cm^3$ (grams per cubic centimetre).

A single-crystal part made of nickel-based superalloy is obtained by a directed solidification process under a thermal gradient during lost-wax casting. The single-crystal nickel-based superalloy comprises an austenitic matrix with face-centred cubic structure, a nickel-based solid solution, referred to as the gamma phase ("γ"). This matrix contains gamma prime ("γ'") hardening phase precipitates with ordered cubic structure $L1_2$ of $Ni_3Al$ type. The whole (matrix and precipitates) is therefore described as a γ/γ' superalloy.

Furthermore, this nickel-based superalloy composition allows the implementation of a heat treatment which places in solution the γ' phase precipitates and the γ/γ' eutectic phases which form during the solidification of the superalloy. A single-crystal nickel-based superalloy can thus be obtained, comprising γ' precipitates of controlled size, preferably between 300 and 500 nanometres (nm), and containing a low proportion of γ/γ' eutectic phases.

The heat treatment also makes it possible to control the level of the fraction of the γ' phase precipitates present in the single-crystal nickel-based superalloy. The molar percentage of γ' phase precipitates can be greater than or equal to 50%, preferably greater than or equal to 60%, still more preferably equal to 70%.

Furthermore, an increased fraction of γ' phase precipitates hinders the movement of the dislocations and promotes the hot creep resistance of the alloy. On the other hand, at lower temperature (<950° C.), the diffusion phenomena are less and the majority of damage occurs through shearing of the γ' phase precipitates. Thus, at lower temperature, the intrinsic resistance of the γ' phase precipitates is a determining factor for the static or creep mechanical strength of the alloys. The chemistry of the alloys of the invention has therefore been adjusted so as to ensure a high mechanical resistance to creep from 650° C. to 1100° C.

The major addition elements are cobalt (Co), chromium (Cr), molybdenum (Mo), rhenium (Re), tungsten (W), aluminium (Al), tantalum (Ta) and platinum (Pt).

The minor addition elements are hafnium (Hf) and silicon (Si), the maximum content of which by weight is less than 1%.

The unavoidable impurities include, for example, sulfur (S), carbon (C), boron (B), yttrium (Y), lanthanum (La) and cerium (Ce). Unavoidable impurities are defined as the elements which are unintentionally added to the composition and which are contributed with other elements. For example, the superalloy may comprise 0.005% by weight carbon.

The addition of tungsten, chromium, cobalt, rhenium or molybdenum primarily makes it possible to reinforce the γ austenitic matrix of the face-centred cubic (cfc) crystalline structure, by hardening in solid solution.

The addition of aluminium (Al) or tantalum (Ta) promotes the precipitation of the hardening phase γ'-$Ni_3$(Al, Ti, Ta).

Rhenium (Re) can slow diffusion of chemical species within the superalloy and limit the coalescence of γ' phase precipitates in service at high temperature, a phenomenon which causes a reduction in the mechanical strength. Rhenium can thus improve the creep resistance at high temperature of the nickel-based superalloy. However, too high a concentration of rhenium can cause the precipitation of intermetallic TCP phases, for example the σ phase, P phase or μ phase, which have a negative effect on the mechanical properties of the superalloy. Too high a concentration of rhenium can also cause the formation of a secondary reaction zone in the superalloy under the sublayer, which has a negative effect on the mechanical properties of the superalloy.

The simultaneous addition of silicon and hafnium enables the hot resistance to oxidation of the nickel-based superalloys to be improved by increasing the adherence of the alumina layer ($Al_2O_3$) which forms at the surface of the superalloy at high temperature. This alumina layer forms a passivation layer at the surface of the nickel-based superalloy and a barrier to the diffusion of oxygen coming from the outside to the inside of the nickel-based superalloy. However, hafnium can be added without also adding silicon or, conversely, silicon can be added without also adding hafnium, and nevertheless improve the hot oxidation resistance of the superalloy.

Furthermore, the addition of chromium and aluminium can improve the resistance to oxidation and corrosion of the superalloy at high temperature. In particular, chromium is essential for increasing the hot resistance to corrosion of the nickel-based superalloys. However, too high a content of chromium tends to reduce the solvus temperature of the γ' phase of the nickel-based superalloy, in other words the temperature above which the γ' phase is totally dissolved in the γ matrix, which is undesirable. In addition, the concentration of chromium is between 5.0 and 7.5% by weight, in order to maintain a high solvus temperature of the γ' phase of the nickel-based superalloy, for example greater than or equal to 1300° C., but also to avoid the formation of topologically close-packed phases in the γ matrix, heavily saturated with alloy elements such as rhenium, molybdenum or tungsten.

The addition of cobalt, which is an element close to nickel and which partially substitutes nickel, forms a solid solution with the nickel in the γ matrix. Cobalt can reinforce the γ matrix, reducing the sensitivity to precipitation of TCP and to formation of SRZ in the superalloy under the protective coating. However, a higher content of cobalt tends to reduce the solvus temperature of the γ' phase of the nickel-based superalloy, which is undesirable.

Further, the content of chromium and cobalt is optimised in order to obtain adequate solvus temperatures for the targeted applications, both for the desired mechanical properties as well as for the heat treatment capacity of the superalloy, with a heat treatment window that is compatible with industrial needs, in other words a difference between the solvus temperature and the solidus temperature of the superalloy which is sufficiently large.

The addition of platinum can increase the temperature stability of the γ' phase by maintaining the high fraction of γ' phase hardening precipitates relative to common alloys when this fraction reduces significantly during the rise in temperature. This maintaining of a high proportion of γ' precipitates at high temperature makes it possible to maintain the mechanical properties of the alloy at temperatures close to the γ' solvus temperature of the alloy.

Moreover, the addition of platinum can improve the resistance to oxidation and corrosion of the superalloy. The addition of platinum in the superalloy can thus improve the service life of the system comprising a superalloy covered with a metal coating and a thermal barrier. In the case of the use of a superalloy with a metal coating of type NixPtyAlz, the addition of platinum to the chemical composition of the superalloy can reduce, or remove, the addition of platinum in the coating.

The addition of refractory elements, such as molybdenum, tungsten, rhenium or tantalum, can slow the mechanisms controlling creep of the nickel-based superalloys, which depend on diffusion of the chemical elements in the superalloy.

A very low sulfur content in a nickel-based superalloy increases the resistance to oxidation and corrosion when hot, as well as the resistance to spalling of the thermal barrier. Thus, a low sulfur content, less than 2 ppm by weight (parts per million by weight), or ideally less than 0.5 ppm by weight, can optimise these properties. Such a content by weight of sulfur can be obtained by producing a low-sulfur parent casting or by a desulfurisation process carried out after casting. It is possible, in particular, to maintain a low sulfur content by adapting the production process of the superalloy.

The term "nickel-based superalloys" shall mean superalloys for which the percentage by weight of nickel is a majority. It is understood that nickel is therefore the element for which the weight percentage in the alloy is highest.

The superalloy can comprise, in weight percentages: 5.4 to 6.0% aluminium, 7.5 to 8.5% tantalum, 2.0 to 4.0% cobalt, 5.0 to 7.5% chromium, 0 to 0.20% molybdenum, 4.5 to 6.0% tungsten, 1.50 to 3.5% rhenium, 1.0 to 4.0% platinum, 0.05 to 0.25% hafnium, 0 to 0.15% silicon, the remainder consisting of nickel and unavoidable impurities.

The superalloy can comprise, in weight percentages: 5.4 to 6.0% aluminium, 7.5 to 8.5% tantalum, 2.0 to 4.0% cobalt, 5.5 to 7.5% chromium, 0 to 0.40% molybdenum, 4.5 to 6.0% tungsten, 1.25 to 3.5% rhenium, 1.5 to 2.5% platinum, 0.05 to 0.15% hafnium, 0 to 0.15% silicon, the remainder consisting of nickel and unavoidable impurities.

The superalloy can comprise, in weight percentages: 5.6 to 6.0% aluminium, 7.5 to 8.5% tantalum, 2.0 to 4.0% cobalt, 6.5 to 7.5% chromium, 4.5 to 5.5% tungsten, 1.25 to 2.25% rhenium, 1.5 to 2.5% platinum, 0.05 to 0.15% hafnium, 0 to 0.15% silicon, the remainder consisting of nickel and unavoidable impurities.

The superalloy can comprise, in weight percentages: 5.4 to 5.8% aluminium, 7.5 to 8.5% tantalum, 2.0 to 4.0% cobalt, 5.5 to 6.5% chromium, 0 to 0.40% molybdenum, 5.0 to 6.0% tungsten, 2.5 to 3.5% rhenium, 1.5 to 2.5% platinum, 0.05 to 0.15% hafnium, 0 to 0.15% silicon, the remainder consisting of nickel and unavoidable impurities.

The superalloy can comprise, in weight percentages: 5.8% aluminium, 8.0% tantalum, 3.0% cobalt, 7.0% chromium, 5.0% tungsten, 1.75% rhenium, 2.0% platinum, 0.05% hafnium, the remainder consisting of nickel and unavoidable impurities.

The superalloy can comprise, in weight percentages: 5.6% aluminium, 8.0% tantalum, 3.0% cobalt, 6.0% chromium, 0.20% molybdenum, 5.5% tungsten, 3.0% rhenium, 2.0% platinum, 0.05% hafnium, the remainder consisting of nickel and unavoidable impurities.

The present disclosure also relates to a single-crystal blade for a turbomachine, comprising a superalloy as defined above.

This blade therefore has an improved creep resistance at high temperature. This blade therefore has an improved resistance to oxidation and corrosion.

In certain embodiments, the blade can comprise a protective coating comprising a metal sublayer deposited on the superalloy and a ceramic thermal barrier deposited on the metal sublayer.

Through the composition of the nickel-based superalloy, the formation of a secondary reaction zone in the superalloy resulting from interdiffusion phenomena between the superalloy and the sublayer is avoided, or limited.

In certain embodiments, the metal sublayer can be an MCrAlY type alloy or a nickel aluminide type alloy.

In certain embodiments, the ceramic thermal barrier can be a yttria-stabilised zirconia based material or any other (zirconia-based) ceramic coating with low thermal conductivity.

In certain embodiments, the blade can have a structure orientated along a <001> crystallographic direction.

This orientation generally gives optimum mechanical properties to the blade.

The present disclosure also relates to a turbomachine comprising a blade as defined above.

BRIEF DESCRIPTION OF THE DRAWINGS

Other features and advantages of the subject matter of the present invention will emerge from the following description of embodiments, provided by way of non-limiting examples, with reference to the accompanying figures.

FIG. 1 is a schematic longitudinal sectional view of a turbomachine.

DETAILED DESCRIPTION

Nickel-based superalloys are intended for the production of single-crystal blades by a directed solidification process in a thermal gradient. The use of a single-crystal seed or grain selector at the start of solidification makes it possible to obtain this single-crystal structure. The structure is, for example, orientated along a <001> crystallographic direction which is the orientation which, in general, gives the superalloys optimum mechanical properties.

The crude solidified single-crystal nickel-based superalloys have a dendritic structure and consist of γ' $Ni_3$(Al, Ti, Ta) precipitates dispersed in a γ matrix with face-centred cubic structure, nickel-based solid solution. These γ' phase precipitates are distributed heterogeneously in the volume of the single crystal due to chemical segregations resulting from the solidification process. Furthermore, γ/γ' eutectic phases are present in the interdendritic regions and constitute preferential sites for initiation of cracks. These γ/γ' eutectic phases form at the end of solidification. Moreover, the γ/γ' eutectic phases are formed to the detriment of fine γ' hardening phase precipitates (of size less than one micrometre). These γ' phase precipitates are the main source of hardening of the nickel-based superalloys. Further, the presence of γ/γ' eutectic phase residues does not allow the hot creep behaviour of the nickel-based superalloy to be optimised.

Indeed, it has been shown that the mechanical properties of superalloys, in particular the creep resistance, was optimum when the precipitation of γ' precipitates was ordered, in other words when the γ' phase precipitates are aligned in a regular manner, with a size ranging from 300 to 500 nm, and when the entirety of the γ/γ' eutectic phases was placed in solution.

The crude solidified nickel-based superalloys are therefore heat treated to obtain the desired distribution of these various phases. The first heat treatment is a treatment for homogenisation of the microstructure which has the objective of dissolving γ' phase precipitates and eliminating the γ/γ' eutectic phases or significantly reducing their molar fraction. This treatment is carried out at a temperature greater than the solvus temperature of the γ' phase and less than the initial melting temperature of the superalloy ($T_{solidus}$). Quenching is then carried out at the end of this first heat treatment in order to obtain a fine and homogeneous dispersion of the γ' precipitates. Tempering heat treatments are then carried out in two steps, at temperatures below the solvus temperature of the phase γ'. During a first step, in order to enlarge the γ' precipitates and obtain the desired size, then during a second step, in order to increase the molar fraction of this phase to approximately 70% at ambient temperature.

Examples

Two single-crystal nickel-based superalloys of the present disclosure (Ex 1 and Ex 2) have been studied and compared with five commercially-available single-crystal superalloys (reference alloys) and two experimental single-crystal superalloys CEx 6 and CEx 7. The experimental single-crystal superalloy CEx 6 is cited in the publication: J. S. Van Sluytman, C. J. Moceri, and T. M. Pollock, "A Pt-modified Ni-base superalloy with high temperature precipitate stability," Mater. Sci. Eng. A, vol. 639, pp. 747-754, July 2015 and the experimental superalloy CEx 7 is cited in the publication: Rame, J., Utada, S., Bortoluci Ormastroni, L. M., Mataveli-Suave, L., Menou, E., Després, L., Kontis, P., Cormier, J., Superalloys 2020, Springer International Publishing, 2020, pp. 71-81. The five commercially-available single-crystal superalloys are: Rene N5® (CEx 1), CMSX-4® (CEx 2), CMSX-4 Plus Mod C® (CEx 3), Rene N6® (CEx 4), CMSX-10® (CEx 5). The chemical composition of each of the single-crystal superalloys is given in Table 1, the compositions CEx 1 and CEx 4 comprising, in addition, 0.05% by weight carbon (C) and 0.004% by weight boron (B), and the composition CEx 6 additionally comprising 0.02% by weight carbon, 0.015% by weight boron and 0.02% by weight zircon. All these superalloys are nickel-based superalloys, in other words the remainder to 100% of the compositions described consists of nickel and unavoidable impurities.

TABLE 1

| | Al | Ta | Ti | Co | Cr | Mo | W | Re | Pt | Hf | Si |
|---|---|---|---|---|---|---|---|---|---|---|---|
| Ex 1 | 5.8 | 8.0 | 0 | 3.0 | 7.0 | 0 | 5.0 | 1.75 | 2.0 | 0.05 | 0 |
| Ex 2 | 5.6 | 8.0 | 0 | 3.0 | 6.0 | 0.2 | 5.5 | 3.0 | 2.0 | 0.05 | 0 |
| CEx 1 | 6.2 | 6.0 | 0 | 8.0 | 7.0 | 2.0 | 5.0 | 3.0 | 0 | 0.2 | 0 |
| CEx 2 | 5.6 | 6.5 | 1.0 | 9.0 | 6.5 | 0.60 | 6.0 | 3.0 | 0 | 0.10 | 0 |
| CEx 3 | 5.7 | 8.0 | 0.85 | 10.0 | 3.5 | 0.60 | 6.0 | 4.8 | 0 | 0.10 | 0 |
| CEx 4 | 6.0 | 7.5 | 0 | 12.2 | 4.4 | 1.1 | 5.7 | 5.3 | 0 | 0.15 | 0 |
| CEx 5 | 5.7 | 8.0 | 0.20 | 3.0 | 2.0 | 0.40 | 5.0 | 6.0 | 0 | 0.03 | 0 |
| CEx 6 | 5.8 | 5.8 | 0.40 | 0 | 6.2 | 1.5 | 2.9 | 3.0 | 7.8 | 0.30 | 0.20 |
| CEx 7 | 5.6 | 9.0 | 1.0 | 9.0 | 6.5 | 0.60 | 6.0 | 1.0 | 2.0 | 0.10 | 0 |

FIG. 1 shows a turbofan engine 10 in cross-section along a vertical plane passing through its principal axis A. The turbofan engine 10 includes, from upstream to downstream in the circulation of the air flow, a fan 12, a low-pressure compressor 14, a high-pressure compressor 16, a combustion chamber 18, a high-pressure turbine 20 and a low-pressure turbine 22.

The high-pressure turbine 20 comprises a plurality of mobile blades 20A turning with the rotor, and flow straighteners 20B (vanes) mounted on the stator. The stator of the turbine 20 comprises a plurality of stator rings 24 disposed opposite the moving blades 20A of the turbine 20.

These properties thus make these superalloys interesting candidates for the production of single-crystal parts intended for the hot parts of turbojets.

It is therefore possible to produce a mobile blade 20A or a flow straightener 20B for a turbomachine comprising a superalloy as defined above.

It is also possible to manufacture a mobile blade 20A or a flow straightener 20B for a turbomachine comprising a superalloy as defined above, coated with a protective coating comprising a metal sublayer.

A turbomachine can, in particular, be a turbojet such as a turbofan 10. The turbomachine can also be a pure turbojet engine, a turboprop engine or a turbine engine.

Density

The density at ambient temperature of each superalloy has been estimated using a modified version of the formula of Hull (F. C. Hull, Metal Progress, November 1969, pp. 139-140). This empirical equation was proposed by Hull. The empirical equation is based on the rule of mixtures and comprises corrective terms deduced from an analysis by linear regression of experimental data (measured densities and chemical compositions) concerning 235 superalloys and stainless steels.

This Hull formula has been modified, in particular to take account of elements such as rhenium and ruthenium. The modified Hull formula given by P. Carondans "High gamma prime solvus New Generation Nickel-Based Superalloys for Single Crystal turbine Blade Applications", 2000, pp. 737-746 is the following:

$$\begin{aligned} d = 8.29604 - 0.00435 \text{ wt \% Co} - &\\ 0.0164 \text{ wt \% (Cr+Mo)} + 0.06274 \text{ wt \% W} + &\\ 0.06274 \text{ wt \% W} + 0.0593 \text{ wt \% (Re+Pt)} + 0.01811 \text{ wt \% Ru} - &\\ 0.06595 \text{ wt \% Al} - 0.0236 \text{ wt \% Ti} + 0.05441 \text{ wt \% Ta} & \end{aligned} \quad (1)$$

where wt % Co, wt % (Cr+Mo), . . . , wt % Ta are the percentages by weight of the elements Co, (Cr+Mo), . . . , Ta.

where d is the density of the superalloy, expressed in $g/cm^3$.

The densities calculated for the alloys of the invention are greater than or equal to 8.75 $g/cm^3$ and less than or equal to 8.95 $g/cm^3$ (see Table 2).

The density is of primary importance for rotary component applications such as turbine blades. More specifically, an increase in the density of the superalloy of the blades requires a reinforcement of the disc carrying them, and therefore another additional weight cost. It is observed that the superalloys Ex 1 and Ex 2 have similar densities to the comparison superalloys, with the exception of the superalloy CEx4 which has a higher density.

Sensitivity to the Formation of SRZ

In order to estimate the sensitivity of nickel-based superalloys containing rhenium to the formation of SRZ, Walston (document U.S. Pat. No. 5,270,123) established the following equation:

$$[SRZ\ (\%)]^{1/2} = 13.88\ (\%\ \mathrm{Re}) + 4.10\ (\%\ \mathrm{W}) - 7.07\ (\%\ \mathrm{Cr}) - 2.94\ (\%\ \mathrm{Mo}) - 0.33\ (\%\ \mathrm{Co}) + 12.13 \quad (2)$$

where SRZ (%) is the linear percentage of SRZ in the superalloy under the coating and where the concentrations of the alloy elements are in atomic percentages.

This equation (2) was obtained by multiple linear regression analysis based on observations made after ageing for 400 hours at 1093° C. (degrees Centigrade) of samples of various nickel-based superalloys from the Rene N6® family of alloys under a NiPtAl coating.

The higher the value of the parameter $[SRZ\ (\%)]^{1/2}$, the more sensitive the superalloy is to the formation of SRZ. In particular, negative values are representative of a low sensitivity to this defect.

Thus, as can be seen in Table 2, for the superalloys Ex 1 and Ex 2, the values of the parameter $[SRZ\ (\%)]^{1/2}$ are all significantly negative and these superalloys therefore have a low sensitivity to the formation of SRZ under a NitPtAl coating, which coating is often present for turbine blade applications (rotating blade and/or nozzle).

No-Freckles Parameter (NFP)

$$NFP = [\%\ \mathrm{Ta} + 1.5\%\ \mathrm{Hf} + 0.5\%\ \mathrm{Mo} - 0.5\%\ \%\ \mathrm{Ti})] / [\%\ \mathrm{W} + 1.2\%\ \mathrm{Re})] \quad (3)$$

where % Cr, % Ni, . . . % X are the contents, expressed as percentages by weight, of the elements of the superalloy Cr, Ni, . . . , X.

The NFP parameter can quantify the sensitivity to the formation of "freckle" type parasite grains during the directed solidification of the part (document U.S. Pat. No. 5,888,451). In order to avoid the formation of "freckle" type defects, the NFP parameter must be greater than or equal to 0.7. A low sensitivity to this type of defect is an important parameter, because this implies a low rejection rate linked to this defect during the production of parts.

As can be seen in Table 2, the superalloys Ex 1 to Ex 2 have an NFP parameter greater than or equal to 0.7. The commercially-available superalloys, such as CEx 2 to CEx 5, have higher sensitivities to the formation of this type of defects, as indicated in Table 2. A low sensitivity to this type of defect is an important parameter, because this implies a low rejection rate linked to this defect during the production of parts.

Cost of Superalloys

The cost per kilogram of the superalloys Ex 1, Ex 2 and CEx 1 to CEx 7 is calculated on the basis of the composition of the superalloy and the costs of each component (updated in April 2020). This cost is given by way of indication only.

The alloys of the invention are competitive, given their positioning with respect to the reference alloys.

Table 2 shows various parameters for the superalloys Ex 1 and Ex 2 and CEx 1 to CEx 7.

TABLE 2

| | Density (1) ($g/cm^3$) | $[SRZ(\%)]^{1/2}$ | NFP | Cost ($/kg) |
|---|---|---|---|---|
| Ex 1 | 8.76 | −32 | 1.10 | 579 |
| Ex 2 | 8.89 | −18 | 0.90 | 612 |
| CEx 1 | 8.61 | −22 | 0.85 | 136 |
| CEx 2 | 8.76 | −14 | 0.67 | 140 |
| CEx 3 | 8.95 | 4 | 0.68 | 184 |
| CEx 4 | 9.92 | 1 | 0.69 | 199 |
| CEx 5 | 8.96 | 16 | 0.67 | 206 |
| CEx 6 | 8.92 | −16 | 1.05 | 2008 |
| CEx 7 | 8.83 | −38 | 1.24 | 561 |

Solvus Temperature of the γ' Phase

The CALPHAD method has been used to calculate the solvus temperature of the γ' phase at equilibrium.

As can be observed in Table 3, the superalloys Ex 1 and Ex 2 have a γ' solvus temperature greater than 1300° C.

Solidus Temperature

The CALPHAD method has been used to calculate the solidus temperatures of the superalloys Ex 1, Ex 2 and CEx 1 to CEx 7.

Heat Treatment Interval (TTH)

The ThermoCalc software (based on TCNI9 data) based on the CALPHAD method has been used to calculate the heat treatment interval of the superalloys.

The ability to produce the alloys of the invention has also been estimated from the possibility to industrially place the γ' phase precipitates in solution in order to optimise the mechanical properties of the alloys. The heat treatment interval has been estimated from the calculation of the solidus temperature and the solvus temperature of the γ' phase precipitates of the alloys. The superalloys Ex 1 and Ex 2 have large heat treatment windows of order 20° C. and more, which is compatible with industrial furnaces. It is noted that the reference superalloys comprising platinum, CEx 6 or CEx 7, have the most restricted heat treatment intervals and are therefore more difficult to heat treat without the risk of burning the alloy, given the uncertainty of industrial furnaces at these temperatures, which can be +/−10° C.

Molar Fraction of the γ' Phase

The CALPHAD method has been used to calculate the molar fraction (in molar percentage) of γ' phase at equilibrium in the superalloys Ex 1, Ex 2 and CEx 1 to CEx 7 at 750° C., 1100° C. and 1250° C.

As can be observed in Table 3, the superalloys Ex 1 and Ex 2 contain molar fractions of γ' phase at very high temperature (1250° C.) that are particularly high (30%), which ensures a high mechanical strength of the alloy at these extreme temperatures.

By comparison, the molar fraction of the commercially-available reference superalloys CEx 1 to CEx 4 is less than that of superalloys Ex 1 and Ex 2, while only the superalloys CEx 5 and CEx 6 have molar fractions of γ' precipitates greater than those of superalloys Ex 1 and Ex 2. These large fractions of γ' precipitates imply high Y' solvus; only CEx 5 has a γ' solvus greater than superalloys Ex 1 and Ex 2. In particular, the superalloys Ex 1 and Ex 2 have molar fractions of γ' precipitate twice as large as those of the reference alloy CEx 7 and a γ' solvus of more than 40° C., which implies an increased resistance to heat of these superalloys compared with the reference superalloy CEx 7.

TABLE 3

| | Transformation temperature (° C.) | | | Molar fraction of γ' phase (mol %) | | |
|---|---|---|---|---|---|---|
| | Solvus | Solidus | TTH | 750° C. | 1100° C. | 1250° C. |
| Ex 1 | 1341 | 1361 | 20 | 76 | 58 | 30 |
| Ex 2 | 1342 | 1367 | 25 | 75 | 57 | 30 |
| CEx 1 | 1295 | 1334 | 39 | 72 | 46 | 13 |
| CEx 2 | 1272 | 1322 | 50 | 63 | 46 | 8 |
| CEx 3 | 1302 | 1328 | 26 | 62 | 53 | 19 |
| CEx 4 | 1281 | 1341 | 60 | 34 | 44 | 10 |
| CEx 5 | 1371 | 1387 | 17 | 74 | 60 | 38 |
| CEx 6 | 1337 | 1327 | −10 | 83 | 59 | 34 |
| CEx 7 | 1298 | 1313 | 15 | 72 | 51 | 17 |

Molar Fraction of Type σ TCP

The CALPHAD method has been used to calculate the molar fraction (in molar percentage) of σ phase at equilibrium in the superalloys Ex 1, Ex 2 and CEx 1 to CEx 7 at 750° C. and 1100° C. (see Table 4)

The calculated molar fractions of σ phase are relatively low, which reflects a low sensitivity to the precipitation of TCP.

The superalloys Ex 1 and Ex 2 have low proportions of TCP phases at these temperatures, which reflects a high microstructural stability of these superalloys. These proportions are less than those of the reference superalloys, except for those of CEx 5 and CEx 7 which are exempt according to the estimations.

Chromium Activity in the γ Phase

The CALPHAD method has been used to calculate the activity of chromium in the γ phase (without units) in the superalloys Ex 1, Ex 2 and CEx 1 to CEx 7 at 950° C. and 1100° C. (see Table 4).

According to these estimations, the superalloys Ex 1 and Ex 2 have chromium activities similar to those of superalloys CEx 1 and CEx 2 which are known to have good resistance to oxidation/corrosion at these temperatures. This indicates a strong potential for the environmental resistance of the superalloys Ex 1 and Ex 2 at high temperature.

Moreover, the chromium activities of superalloys Ex 1 and Ex 2 are greater than those of the reference superalloys CEx 3 to CEx 5. This is manifest by a better behaviour of the superalloys Ex 1 and Ex 2 with regard to resistance to the environment in comparison with superalloys CEx 3 to CEx 5. The Cr contents of the superalloys Ex 1 and Ex 2 are similar to that of the reference superalloy CEx 7.

TABLE 4

| | Molar fraction of TCP of type σ (in mol %) | | Chromium activity in the γ phase | |
|---|---|---|---|---|
| | 750° C. | 1100° C. | 950° C. | 1100° C. |
| Ex 1 | 0.2 | 0 | 2.6 $10^{-3}$ | 1.5 $10^{-3}$ |
| Ex 2 | 1.0 | 0 | 2.1 $10^{-3}$ | 1.2 $10^{-3}$ |

TABLE 4-continued

| | Molar fraction of TCP of type σ (in mol %) | | Chromium activity in the γ phase | |
|---|---|---|---|---|
| | 750° C. | 1100° C. | 950° C. | 1100° C. |
| CEx 1 | 1.5 | 0 | 2.6 $10^{-3}$ | 1.4 $10^{-3}$ |
| CEx 2 | 2.2 | 0 | 2.5 $10^{-3}$ | 1.4 $10^{-3}$ |
| CEx 3 | 1.7 | 0 | 1.3 $10^{-3}$ | 7.8 $10^{-4}$ |
| CEx 4 | 2.9 | 0 | 1.5 $10^{-3}$ | 8.8 $10^{-4}$ |
| CEx 5 | 0 | 0 | 4.5 $10^{-4}$ | 3.3 $10^{-4}$ |
| CEx 6 | 2.2 | 0 | 2.0 $10^{-3}$ | 1.1 $10^{-3}$ |
| CEx 7 | 0 | 0 | 2.8 $10^{-3}$ | 1.5 $10^{-3}$ |

According to the various criteria taken into account, the example alloys of the invention thus have a strong potential for high temperature applications, in particular for the production of turbine blades, combining an adequate compromise that combines low density, high mechanical strength, low sensitivity to the formation of defects (TCP, SRZ, casting defects), while maintaining high resistance to oxidation and corrosion.

In particular, in comparison with reference superalloy CEx 7, the superalloys Ex 1 and Ex 2 have a significantly greater average mechanical strength at high temperature (950° C. to 1250° C.) due to the fact of the solvus temperatures being 40° C. higher and the content of γ' precipitates being twice as high at 1250° C. This effect is due, in particular, to the enrichment with rhenium at a level of 1.75% and 3%, in percentages by weight. Moreover, the heat treatment window of the superalloys Ex 1 and Ex 2 has been improved relative to the reference superalloy CEx 7 with an increase in this interval of 5 to 10° C., which makes the superalloys Ex 1 and Ex 2 more suitable for an industrial application.

Furthermore, the high static mechanical strength at low temperature (<750° C.) of the reference superalloy CEx 7 has been maintained for the superalloys Ex 1 and Ex 2 through the high tantalum content.

The environmental resistance of the superalloys Ex 1 and Ex 2 is predicted to be similar to that of the reference superalloy CEx 7 (% Cr).

Although the present disclosure has been described by referring to a specific exemplary embodiment, it is obvious that various modifications and changes can be made to these examples without going beyond the general scope of the invention as defined by the claims. In addition, the individual features of different embodiments mentioned can be combined in additional embodiments. Consequently, the description and the drawings should be considered as illustrating rather than limiting.

The invention claimed is:

1. A nickel-based superalloy comprising in weight percentages: 5.4 to 6.0% aluminium, 7.5 to 8.5% tantalum, 2.0 to 4.0% cobalt, 5.0 to 7.5% chromium, 0 to 0.20% molybdenum, 4.5 to 6.0% tungsten, 1.50 to 3.5% rhenium, 1.0 to 4.0% platinum, 0.05 to 0.25% hafnium, 0 to 0.15% of silicon, the remainder consisting of nickel and unavoidable impurities.

2. The superalloy according to claim 1, comprising in weight percentages: 5.6 to 6.0% aluminum, 7.5 to 8.5% tantalum, 2.0 to 4.0% cobalt, 6.5 to 7.5% chromium, 4.5 to 5.5% tungsten, 1.50 to 2.25% rhenium, 1.5 to 2.5% platinum, 0.05 to 0.15% hafnium, 0 to 0.15% silicon, the remainder consisting of nickel and unavoidable impurities.

3. The superalloy according to claim 1, comprising in weight percentages: 5.8% aluminium, 8.0% tantalum, 3.0% cobalt, 7.0% chromium, 5.0% tungsten, 1.75% rhenium, 2.0% platinum, 0.05% hafnium, the remainder consisting of nickel and unavoidable impurities.

4. The superalloy according to claim 1, comprising in weight percentages: 5.6% aluminium, 8.0% tantalum, 3.0% cobalt, 6.0% chromium, 0.20% molybdenum, 5.5% tungsten, 3.0% rhenium, 2.0% platinum, 0.05% hafnium, the remainder consisting of nickel and unavoidable impurities.

5. A single-crystal blade for a turbomachine, comprising a superalloy according to claim 1.

6. The single-crystal blade according to claim 5, comprising a protective coating comprising a metal sublayer deposited on the superalloy and a ceramic thermal barrier deposited on the metal sublayer.

7. The single-crystal blade according to claim 5, having a structure oriented in a <001> crystallographic direction.

8. A turbomachine comprising a single-crystal blade according to claim 5.

* * * * *